United States Patent Office 3,275,697
Patented Sept. 27, 1966

3,275,697
PRODUCTION OF TETRACHLOROBENZENES
John W. Churchill and Theodore M. Jenney, Kenmore, N.Y., assignors to Olin Mathieson Chemical Corporation, a corporation of Virginia
No Drawing. Filed Jan. 4, 1954, Ser. No. 402,174
13 Claims. (Cl. 260—650)

Our invention relates to a flexible, integrated, cyclic process for the production of 1,2,4-trichlorobenzene and 1,2,4,5-tetrachlorobenzene selectively from mixtures of isomers of trichlorobenzene.

Trichlorobenzenes and tetrachlorobenzenes may be produced by the chlorination of benzene or polychlorobenzenes or by the dehydrochlorination of benzene hexachloride. Mixtures of isomers of trichlorobenzene and tetrachlorobenzene are obtained which may be separated by repeated fractionation in order to recover the components. The separation of the 1,2,4-trichlorobenzene from other isomers of trichlorobenzene or the separation of 1,2,4,5-tetrachlorobenzene from other polychlorobenzenes by distillation is very difficult due to the small differences in boiling points. Repeated fractionation is required and yields are unsatisfactory. 1,2,4-trichlorobenzene is a particularly useful material in that it has unique properties that make it useful as a non-flammable heat transfer composition and in that it may be used to produce 2,5-dichlorophenol which has particular utility in the manufacture of resins. 1,2,4,5-tetrachlorobenzene is a particularly useful material in that it may be used to produce 2,4,5-trichlorophenol. This phenol is useful, for example, as an intermediate in the manufacture of bactericidal soap additives.

We have devised a flexible, integrated, cyclic process for producing selectively high yields of fractions substantially enriched in useful 1,2,4-trichlorobenzene and useful 1,2,4,5-tetrachlorobenzene from mixtures of isomers of trichlorobenzene in which advantageous flexibility in the production of desired amounts of 1,2,4-trichlorobenzene and 1,2,4,5-tetrachlorobenzene is obtained and in which by-products advantageously may be recycled to the process. We have found that 1,2,4-trichlorobenzene and 1,2,4,5-tetrachlorobenzene are produced selectively in good yields and in substantially enriched fractions, i.e., fractions containing about 90 percent or more 1,2,4-trichlorobenzene and fractions containing as much as 95 percent or more of 1,2,4,5-tetrachlorobenzene, by selectively chlorinating a mixture of isomers of trichlorobenzene to form a mixture comprising isomeric tetrachlorobenzenes and 1,2,4-trichlorobenzene, fractionally distilling the chlorinated mixture to separate a fraction substantially enriched in 1,2,4-trichlorobenzene and a fraction comprising isomers of tetrachlorobenzene and crystallizing a fraction substantially enriched in 1,2,4,5-tetrachlorobenzene from the tetrachlorobenzenes fraction. We have found in the chlorination of a mixture of isomers of trichlorobenzenes comprising the 1,2,3- and 1,2,4-isomers, that 1,2,3-trichlorobenzene is converted more rapidly than 1,2,4-trichlorobenzene to tetrachlorobenzenes, thereby selectively removing the 1,2,3-isomer and enriching the resulting mixture in the 1,2,4-isomer and permitting its easy separation from the tetrachlorobenzenes formed by distillation. We have also found that substantially pure 1,2,4,5-tetrachlorobenzene is produced by crystallization as a solid from the mixture of isomers of tetrachlorobenzene comprising the 1,2,3,4- and 1,2,4,5-isomers, recovered from the 1,2,4-trichlorobenzene separation step.

According to our invention, a mixture of isomers of trichlorobenzene, comprising the 1,2,3- and 1,2,4-isomers, is selectively chlorinated at a temperature of about 50 to 250° C. and preferably about 100 to 250° C. Preferably the mixture is chlorinated until about 30 to 90 percent of tetrachlorobenzenes are present. The chlorinated mixture comprising 1,2,4-trichlorobenzene, 1,2,3-trichlorobenzene in minor proportions, isomeric tetrachlorobenzenes and higher chlorinated benzenes such as pentachlorobenzene, is then fractionally distilled and a fraction substantially enriched in 1,2,4-trichlorobenzene, i.e., containing about 90 percent or more 1,2,4-trichlorobenzene, is removed overhead in good yields. Lower chlorobenzenes, which may be present in the trichlorobenzene mixture, may also be separated and advantageously recycled to the chlorination step. The bottoms fraction comprises a mixture of isomeric tetrachlorobenzenes, containing usually about 50 percent of 1,2,4,5-tetrachlorobenzene, about 45 percent 1,2,3,4-tetrachlorobenzene and about 5 percent pentachlorobenzene. The bottoms fraction is chilled to about 50° C. or below to obtain a high yield of a solid 1,2,4,5-tetrachlorobenzene fraction containing up to about 99 percent of this isomer. The mother liquor from the 1,2,4,5-tetrachlorobenzene separation step contains mostly 1,2,3,4-tetrachlorobenzene with some 1,2,4,5-isomer and higher chlorinated benzenes such as pentachlorobenzene. It advantageously may be dechlorinated, for example, by catalytic hydrogenation or other means, and returned to the chlorination step.

Thus, the process of our invention provides a flexible, integrated, cyclic method of producing 1,2,4-trichlorobenzene and 1,2,4,5-tetrachlorobenzene in high yields and in substantially pure form. The process is especially advantageous in its flexibility as to the production of desired amounts of 1,2,4-trichlorobenzene and 1,2,4,5-tetrachlorobenzene. Thus, when 1,2,4-trichlorobenzene is desired in the larger proportions, the proportion of chlorine used in the chlorination step is restricted to increase the proportion of trichlorobenzenes and decrease the proportion of tetrachlorobenzenes, which increases the yield of 1,2,4-trichlorobenzene. When 1,2,4,5-tetrachlorobenzene is desired in the larger proportion, the proportion of chlorine used in the chlorination step is increased to increase the proportion of tetrachlorobenzenes formed. Also, the 1,2,4-trichlorobenzene fraction obtained in the distillation step may be recycled in whole or in part to the chlorination to aid in the formation of increased proportions of tetrachlorobenzenes.

The mixtures of isomers of trichlorobenzene useful for selective chlorination and separation according to our invention, may be prepared by the chlorination of benzene, chlorobenzene, or dichlorobenzenes. Advantageously, however, benzene hexachloride is dehydrochlorinated thermally or catalytically, for example, with ferric chloride, to produce mixtures of isomers of trichlorobenzene suitable for further chlorination according to the process of our invention. A particularly advantageous source of benzene hexachloride is the insecticidally inactive benzene hexachloride isomers, particularly the alpha and beta isomers, produced by the separation of the insecticidally active gamma isomer from crude benzene hexachloride. This material is of limited usefulness and thereby furnishes an advantageous starting material. The mixtures produced by the dehydrochlorination of the waste benzene hexachloride isomers usually comprise about 70 to 75 percent of 1,2,4-trichlorobenzene and about 25 percent of 1,2,3-trichlorobenzene. In the dehydrochlorination of benzene hexachloride, chlorine may be used as a dehydrochlorinating agent in small amounts, for example, in an amount equal to about 0.1 to 10 grams per kilogram of benzene hexachloride, in a liquid phase operation conducted at a temperature of about 110° C. to 250° C. to produce a mixture comprising about 65 to 70 percent of 1,2,4-trichlorobenzene, about 25 percent of 1,2,3-trichlorobenzene and about 6 percent of tetrachlorobenzenes. Selective chlorination produces a mixture comprising 1,2,4-trichlorobenzene and tetrachlorobenzenes from which a 1,2,4-trichlorobenzene fraction and a fraction comprising mixtures of isomers of tetrachlorobenzene are easily separated by distillation. 1,2,4,5-tetrachlorobenzene is recovered by crystallization from the fraction comprising mixtures of isomers of tetrachlorobenzene.

In another and preferable alternative, however, the dehydrochlorination of benzene hexachloride and selective chlorination step are combined in one operation to produce directly and in a single step a mixture of tri- and tetra-chlorobenzenes which are suitable for further processing according to the present invention. Thus, by contacting liquid phase benzene hexachloride with suitable proportions of chlorine in the presence of a nuclear chlorination catalyst, e.g. ferric chloride, at temperatures of about 100 to 250° C., the benzene hexachloride can be converted to a mixture of approximately equal proportions of trichlorobenzenes and tetrachlorobenzenes. Suitable proportions of chlorine to obtain such a mixture are approximately one-half mole of chlorine for each mole of benzene hexachloride. The mixture has an isomer distribution of approximately 45 weight percent 1,2,4-trichlorobenzene, 5 weight percent 1,2,3-trichlorobenzene, 25 weight percent 1,2,4,5,-tetrachlorobenzene, 22 weight percent 1,2,3,4-tetrachlorobenzene, and 3 weight percent pentachlorobenzene. Th mixture is easily fractionated to obtain a trichlorobenzene fraction containing about 90 percent or more of 1,2,4-trichlorobenzene, and not over about 10 percent of 1,2,3-trichlorobenzene, and a bottoms fraction comprising about 50 percent of 1,2,4,5-tetrachlorobenzene, about 44 percent of 1,2,3,4-tetrachlorobenzene and about 6 percent pentachlorobenzene. On chilling the bottoms fraction to about 50° C., about 75 percent of the contained 1,2,4,5-tetrachlorobenzene is recovered as a substantially pure compound containing at least about 95 percent 1,2,4,5-tetrachlorobenzene.

The chlorinations may be carried out in the liquid phase, advantageously at atmospheric pressures. Suitable temperatures depend partly on the boiling points of the components of the mixture but may range from about 50 to 250° C. and preferably from about 100 to 250° C. When major proportions of benzene are present, as in initial stages, the temperatures should be maintained in the lower portions of this range to avoid vaporization losses. However, as the concentration of the more highly chlorinated benzenes increases, the temperatures may be increased into the upper portions of the range. Superatmospheric pressures may be used but usually are necessary only when the temperatures are in the upper portion of the range or when relatively large proportions of the lower chlorination products are present or both. Lower temperatures are advantageous in that mixtures containing higher proportions of 1,2,4-trichlorobenzene are obtained than when higher temperatures are used at the same degree of chlorination.

The chlorination of the mixtures of isomers of trichlorobenzene is preferably carried out until about 30 to 90 percent of tetrachlorobenzenes are present. This corresponds to an average chlorine content of about 3.3 to 3.9 atoms per benzene nucleus. At lower degrees of chlorination, little enrichment of the mixture with respect to 1,2,4-trichlorobenzene may be obtained and the proportion of recycle, when material proportions of tetrachlorobenzenes are desired, may be large. The production of higher purity 1,2,4-trichlorobenzene is possible when the degree of chlorination is higher. Thus, when about 3.8 or more atoms of chlorine per benzene nucleus are present in the mixture, the proportion of trichlorobenzenes in the mixture may be low, for example, about 20 percent, but the small proportion will be substantially pure 1,2,4-trichlorobenzene.

The 90 percent 1,2,4-trichlorobenzene fraction advantageously may be recycled in whole or in part and further chlorinated if increased proportions of tetrachlorobenzene are desired. This stock rich in 1,2,4-trichlorobenzene produces a tetrachlorobenzene mixture rich in 1,2,4,5-tetrachlorobenzene. When 50 percent of the trichlorobenzene has been chlorinated, the approximate composition is 47 weight percent 1,2,4-trichlorobenzene, 3 weight percent 1,2,3-trichlorobenzene, 30 weight percent 1,2,4,5-tetrachlorobenzene, 18 weight percent 1,2,3,4-tetrachlorobenzene, and 2 weight percent pentachlorobenzene. When this material is fractionated, a crude tetrachlorobenzene fraction containing about 60 percent of 1,2,4,5-tetrachlorobenzene, 36 percent of 1,2,3,4-tetrachlorobenzene and about 4 percent of pentachlorobenzene is obtained. On chilling this tetrachlorobenzene fraction to about 50° C. about 83 percent of the contained 1,2,4,5-tetrachlorobenzene is recovered as a substantially pure compound of at least 95 percent purity. In this modification, we prefer to recycle the distilled trichlorobenzene with new feed stock to simplify operations. The overall yield of 1,2,4,5-tetrachlorobenzene is then the weighted average of the yields obtainable by separate chlorinations of the fresh and recycle feed. The average composition at 50 percent chlorination to tetrachlorobenzenes is 46 weight percent 1,2,4-trichlorobenzene, 4 weight percent 1,2,3-trichlorobenzene, 27.5 weight percent 1,2,4,5-tetrachlorobenzene, 20 weight percent 1,2,3,4-tetrachlorobenzene, and 2.5 weight percent pentachlorobenzene. The composition of the tetrachlorobenzene cut fractionated from the mixture is about 55 percent of 1,2,4,5-tetrachlorobenzene, 40 percent of 1,2,3,4-tetrachlorobenzene and 5 percent of pentachlorobenzene. On crystallization to 50° C., 78 percent of the 1,2,4,5-tetrachlorobenzene is recovered as a substantially pure compound of at least 95 percent purity.

The mother liquor from the crystallization of 1,2,4,5-tetrachlorobenzene from the tetrachlorobenzenes mixture contains about 20 percent of 1,2,4,5,-tetrachlorobenzene, 72.5 percent of 1,2,3,4,-tetrachlorobenzene and 7.5 percent of pentachlorobenzene. The mother liquor may be dechlorinated, for example, by catalytic hydrogenation, and returned to the chlorination step or may be converted to pentachlorobenzene and hexachlorobenzene. Pentachlorobenzene may be nitrated to form the useful pentachloronitrobenzene and the hexachlorobenzene is useful for the production of pentachlorophenol. Because of the existence of only one isomer of pentachlorobenzene or of hexachlorobenzene, these materials are readily separable into the pure components.

We claim:

1. A flexible process for the production of 1,2,4,-trichlorobenzene and 1,2,4,5-tetrachlorobenzene selectively which comprises selectively chlorinating a mixture consisting essentially of 1,2,3-trichlorobenzene and 1,2,4-trichlorobenzene at a temperature of about 50 to 250° C. to produce a mixture comprising 1,2,4-trichlorobenzene and isomers of tetrachlorobenzene, fractionally distilling the mixture to separate overhead a fraction substantially enriched in 1,2,4-trichlorobenzene and a fraction consisting essentially of a mixture of 1,2,3,4,-tetrachlorobenzene and 1,2,4,5-tetrachlorobenzene, cooling the mixture of 1,2,3,4-tetrachlorobenzene and 1,2,3,4,5-tetrachlorobenzene to a temperature below about 50° C. and separating solid substantially pure 1,2,4,5-tetrachlorobenezene.

2. The process of claim 1 in which the mixture consisting essentially of 1,2,3,-trichlorobenzene and 1,2,4-trichlorobenzene is obtained by dehydrochlorinating benzene hexachloride.

3. The process of claim 2 in which the temperature of chlorination is about 100° to 250° C. and the dehydrochlorination of benzene hexachloride and selective chlorination are carried out in a single step to produce the mixture comprising 1,2,4-trichlorobenzene and isomers of tetrachlorobenzenes by contacting liquid phase benzene hexachloride with chlorine in proportions of about 0.5 moles of chlorine per mole of benzene hexachloride and in the presence of a nuclear chlorination catalyst.

4. A flexible process for the production of 1,2,4-trichlorobenzene and 1,2,4,5-tetrachlorobenzene selectively which comprises selectively chlorinating a mixture consisting essentially of 1,2,3-trichlorobenzene and 1,2,4,-trichlorobenzene at a temperature of about 100 to 250° C. to produce a mixture comprising 1,2,4-trichlorobenzene and about 30 to 90 weight percent isomers of tetrachlorobenzene, fractionally distilling the mixture of separate overhead a fraction substantially enriched in 1,2,4-trichlorobenzene and a fraction consisting essentially of a mixture of 1,2,3,4-tetrachlorobenzene and 1,2,4,5-tetrachlorobenzene, cooling the mixture of 1,2,3,4-tetrachlorobenzene and 1,2,4,5,-tetrachlorobenzene to a temperature below about 50° C. and separating solid substantially pure 1,2,4,5-tetrachlorobenzene.

5. The process of claim 3 in which the mixture consisting essentially of 1,2,3-trichlorobenzene and 1,2,4-trichlorobenzene is obtained by dehydrochlorinating benzene hexachloride.

6. The process which comprises chlorinating a mixture consisting essentially of 1,2,3-trichlorobenzene and 1,2,4-trichlorobenzene at a temperature of about 100° to 150° C. to produce a mixture comprising 1,2,4-trichlorobenzene and isomers of tetrachlorobenzene, fractionally distilling the mixture of separate overhead a fraction substantially enriched in 1,2,4-trichlorobenzene and to leave a fraction consisting essentially of a mixture of 1,2,3,4-tetrachlorobenzene and 1,2,4,5-tetrachlorobenzene, cooling and mixture to a temperature below about 50° C. to crystallize the 1,2,3,4,5-tetrachlorobenzene and separating the latter.

7. A process for the production of 1,2,4-trichlorobenzene which comprises selectively chlorinating a mixture consisting essentially of 1,2,3-trichlorobenzene and 1,2,4-trichlorobenzene at a temperature of about 50 to 250° C. to produce a mixture comprising 1,2,4-trichlorobenzene and isomeric tetrachlorobenzenes and separating overhead by fractional distillation of the mixture a fraction substantially enriched in 1,2,4-trichlorobenzene.

8. The process of claim 7 in which the mixture consisting essentially of 1,2,3-trichlorobenzene and 1,2,4-trichlorobenzene is obtained by dehydrochlorinating benzene hexachloride.

9. A process for the production of 1,2,4-trichlorobenzene which comprises selectively chlorinating a mixture consisting essentially of 1,2,3-trichlorobenzene and 1,2,4-trichlorobenzene at a temperature of about 100 to 250° C. to produce a mixture comprising 1,2,4-trichlorobenzene and about 30 to 90 weight percent isomeric tetrachlorobenzenes and separating overhead by fractional distillation of the mixture a fraction substantially enriched in 1,2,4-trichlorobenzene.

10. The process of claim 9 in which the mixture consisting essentially of 1,2,3-trichlorobenzene and 1,2,4-trichlorobenzene is obtained by dehydrochlorinating benzene hexachloride.

11. A process for the production of 1,2,4-trichlorobenzene which comprises selectively chlorinating a mixture consisting essentially of about 25 percent 1,2,3-trichlorobenzene and about 65 to 75 percent 1,2,4-trichlorobenzene at a temperature of about 100 to 250° C. to produce a mixture comprising 1,2,4-trichlorobenzene and about 30 to 90 weight percent isomeric tetrachlorobenzenes and separating overhead by fractional distillation of the mixture a fraction substantially enriched in 1,2,4-trichlorobenzene.

12. The process of claim 8 in which the temperature of chlorination is about 100° to 250° C. and the dehydrochlorination of benzene hexachloride and selective chlorination are carried out in a single step to produce the mixture comprising 1,2,4-trichlorobenzene and isomers of tetrachlorobenzenes by contacting liquid phase benzene hexachloride with chlorine in proportion of about 0.5 moles of chlorine per mole of benzene hexachloride in the presence of a nuclear chlorination catalyst.

13. The process which comprises chlorinating a mixture consisting essentially of 1,2,3-trichlorobenzene and 1,2,4-trichlorobenzene at a temperature of about 50° to 150° C. to produce a mixture comprising 1,2,4-trichlorobenzene and isomers of tetrachlorobenzene, fractionally distilling the mixture to separate overhead a fraction substantially enriched in 1,2,4-trichlorobenzene and to leave a fraction consisting essentially of a mixture of 1,2,3,4-tetrachlorobenzene and 1,2,4,5-tetrachlorobenzene, cooling said mixture to a temperature below about 50° C. to crystallize the 1,2,4,5-tetrachlorobenzene and separating the latter.

References Cited by the Examiner

UNITED STATES PATENTS

| | | | |
|---|---|---|---|
| 1,934,675 | 11/1933 | Mills | 260—650 |
| 2,843,637 | 7/1958 | Clarke et al. | |

FOREIGN PATENTS 655,686   8/1951   Great Britain.

OTHER REFERENCES

"Handbook of Chemistry and Physics," 28th edition, Pages 626 to 627 (Chemical Rubber Publishing Co., 1944).

LEON ZITVER, *Primary Examiner.*

E. W. HUTCHISON, A. M. BOETTCHER, M. STERMAN, *Examiners.*

S. H. BLECH, K. V. ROCKEY, *Assistant Examiners.*

UNITED STATES PATENT OFFICE
CERTIFICATE OF CORRECTION

Patent No. 3,275,697 September 27, 1966

John W. Churchill et al.

It is hereby certified that error appears in the above numbered patent requiring correction and that the said Letters Patent should read as corrected below.

Column 4, line 59, strike out "3"; column 5, line 8, for "of" read -- to --; line 16, for "3" read -- 4 --; line 25, for "of" read -- to --; line 28, for "and", second occurrence, read -- said --; same column 5, line 30, strike out "3,".

Signed and sealed this 29th day of August 1967.

(SEAL)
Attest:

ERNEST W. SWIDER
Attesting Officer

EDWARD J. BRENNER
Commissioner of Patents